(12) United States Patent
Hu et al.

(10) Patent No.: US 10,640,124 B2
(45) Date of Patent: May 5, 2020

(54) DRIVE PROCESS RECOGNITION AND OPTIMIZATION

(71) Applicant: ABB Schweiz AG, Baden (CH)

(72) Inventors: Zhongliang Hu, Espoo (FI); Mikko Kohvakka, Espoo (FI); Teemu Tanila, Espoo (FI)

(73) Assignee: ABB Schweiz AG, Baden (CH)

( * ) Notice: Subject to any disclaimer, the term of this patent is extended or adjusted under 35 U.S.C. 154(b) by 0 days.

(21) Appl. No.: 15/949,588

(22) Filed: Apr. 10, 2018

(65) Prior Publication Data
US 2018/0290665 A1  Oct. 11, 2018

(30) Foreign Application Priority Data

Apr. 10, 2017 (EP) .................................. 17165724

(51) Int. Cl.
| | |
|---|---|
| *H04L 29/08* | (2006.01) |
| *B60W 50/08* | (2020.01) |
| *G07C 5/00* | (2006.01) |
| *G07C 5/08* | (2006.01) |
| *B60W 50/14* | (2020.01) |

(Continued)

(52) U.S. Cl.
CPC .......... *B60W 50/085* (2013.01); *B60W 50/06* (2013.01); *B60W 50/14* (2013.01); *G05B 19/042* (2013.01); *G07C 5/008* (2013.01); *G07C 5/0841* (2013.01); *H04L 67/12* (2013.01); *H04L 67/34* (2013.01); *B60W 2050/0026* (2013.01); *B60W 2050/0077* (2013.01); *G06F 16/2282* (2019.01); *G06F 16/24* (2019.01)

(58) Field of Classification Search
None
See application file for complete search history.

(56) References Cited

U.S. PATENT DOCUMENTS

| | | |
|---|---|---|
| 6,555,984 B1 | 4/2003 | Rajala et al. |
| 2013/0198443 A1 | 8/2013 | Braun et al. |

(Continued)

FOREIGN PATENT DOCUMENTS

| | | |
|---|---|---|
| EP | 1369755 A2 | 12/2003 |
| EP | 1369755 A3 | 12/2003 |

OTHER PUBLICATIONS

Chuang et al., "Implementation of Big Data Processing for Intelligent Rotating Machinery System", Automation 2015 (Nov. 13-15), p. 257-260 (Year: 2015).*

(Continued)

*Primary Examiner* — Tamara L Weber
(74) *Attorney, Agent, or Firm* — J. Bruce Schelkopf; Taft Stettinius & Hollister LLP (57) ABSTRACT

According to an aspect, a method including receiving, by a remote computing apparatus, drive parameter data sent from a drive via a communications network, to a remote computing apparatus; storing the drive parameters to a database; calculating an expected drive registration data object value for the drive using the first algorithm based on the drive parameter data; comparing the expected drive registration data object differs from the drive registration data object included in the drive registration data for the drive, causing sending information on a conflicting registration data object from the remote computing apparatus via the communications network to the drive.

18 Claims, 9 Drawing Sheets

(51) Int. Cl.
  *B60W 50/06*   (2006.01)
  *G05B 19/042*  (2006.01)
  *B60W 50/00*   (2006.01)
  *G06F 16/24*   (2019.01)
  *G06F 16/22*   (2019.01)

(56) References Cited

U.S. PATENT DOCUMENTS

2015/0168268 A1* 6/2015 Fish ............... G05B 23/0235
                                                         374/142
2017/0285623 A1* 10/2017 Figoli ............ G05B 19/41855
2018/0088541 A1* 3/2018 Sangi .................. H04W 4/70
2018/0320684 A1* 11/2018 Rosca ................. G05B 19/05

OTHER PUBLICATIONS

Rink et al., "The Power of PdMetrics(TM): Optimizing Operations with Predictive Maintenance", accessed Jan. 2017 http://www.ipsen.de/EN/Documents/Ipsen-Europe/English/PdMetrics__EN.pdf (Year: 2017).*

European Patent Office, Search Report issued in corresponding Application No. 17165724.0, dated Oct. 26, 2017, 4 pp.

* cited by examiner

DRIVE PROCESS RECOGNITION AND OPTIMIZATION

FIELD OF THE INVENTION

The invention relates to the automated control of drives. In particular, the invention discloses a method and an apparatus for collecting drive parameter data, analyzing the data and recognizing the process of the drive or optimizing the drive parameters for optimal performance based on the analysis.

BACKGROUND

The following background description art may include insights, discoveries, understandings or disclosures, or associations together with disclosures not known to the relevant art prior to the present invention but provided by the present disclosure. Some such contributions disclosed herein may be specifically pointed out below, whereas other such contributions encompassed by the present disclosure the invention will be apparent from their context.

Drives are used to control the motion of machines, typically to achieve optimal performance and efficiency from the given machine or machines. In electrical drives, this control is commonly achieved by changing the magnitude and/or frequency or just the magnitude of electricity supplied to the load (typically, an electrical motor or motors powering a process) while a hydraulic or mechanical drive may be used to control a hydraulic or mechanical machinery, respectively. By changing the drive parameters, the physical parameters, for example, the speed and torque of a motor connected to the drive, may be manipulated. In exemplary operation, an electric alternating current (AC) drive receives AC current with a certain frequency and voltage level from an electrical power supply and converts said frequency to another frequency and possibly changes the voltage level of the current based on the load, that is, based on the properties of the AC electric motor connected to the drive and the properties of the process which the motor is powering. For example, if the motor is running a conveyor belt, the load may depend on the number of objects on the conveyor belt and the properties of said objects, for example, weight. Finally, the altered AC current is supplied to the motor leading to a more efficient process compared to feeding the motor directly from the electrical power supply.

Drives are commonly used in many industrial processes to control, for example, conveyor belts, fans or pumps. As different industrial processes may have very different functions and/or power demands, the drive parameters for optimal, energy-efficient operation may also differ considerably. Therefore, setting the drive parameters correctly during the commissioning of a drive is critical. This requires a lot of expertise and testing as the drive parameters may also depend on certain properties of the used drive, for example, motor type, further complicating the matter. Often the drive parameters are not initially set optimally, which leads to non-optimal process and performance. Drives may also be moved from one process to another during their operational lifetime requiring adjusting of the drive parameters. Moreover, the properties of the process may change during the running of the process requiring updating of the drive parameters, for example, the material flow through a pump may vary considerably during many industrial processes.

BRIEF DESCRIPTION OF THE INVENTION

The following presents a simplified summary of features disclosed herein to provide a basic understanding of some exemplary aspects of the invention. This summary is not an extensive overview of the invention. It is not intended to identify key/critical elements of the invention or to delineate the scope of the invention. Its sole purpose is to present some concepts disclosed herein in a simplified form as a prelude to a more detailed description. According to an aspect, there is provided the subject matter of the independent claims. Embodiments are defined in the dependent claims.

One or more examples of implementations are set forth in more detail in the accompanying drawings and the description below. Other features will be apparent from the description and drawings, and from the claims.

Some embodiments provide methods, apparatuses, a system and a computer program product for collecting and analyzing drive parameter data.

BRIEF DESCRIPTION OF THE DRAWINGS

In the following the invention will be described in greater detail by means of preferred embodiments with reference to the attached drawings, in which.

DETAILED DESCRIPTION OF EMBODIMENTS

The following embodiments are exemplary. Although the specification may refer to "an", "one", or "some" embodiment(s) in several locations, this does not necessarily mean that each such reference is to the same embodiment(s), or that the feature only applies to a single embodiment. Single features of different embodiments may also be combined to provide other embodiments. Furthermore, words "comprising" and "including" should be understood as not limiting the described embodiments to consist of only those features that have been mentioned and such embodiments may contain also features/structures that have not been specifically mentioned.

Figure 1:
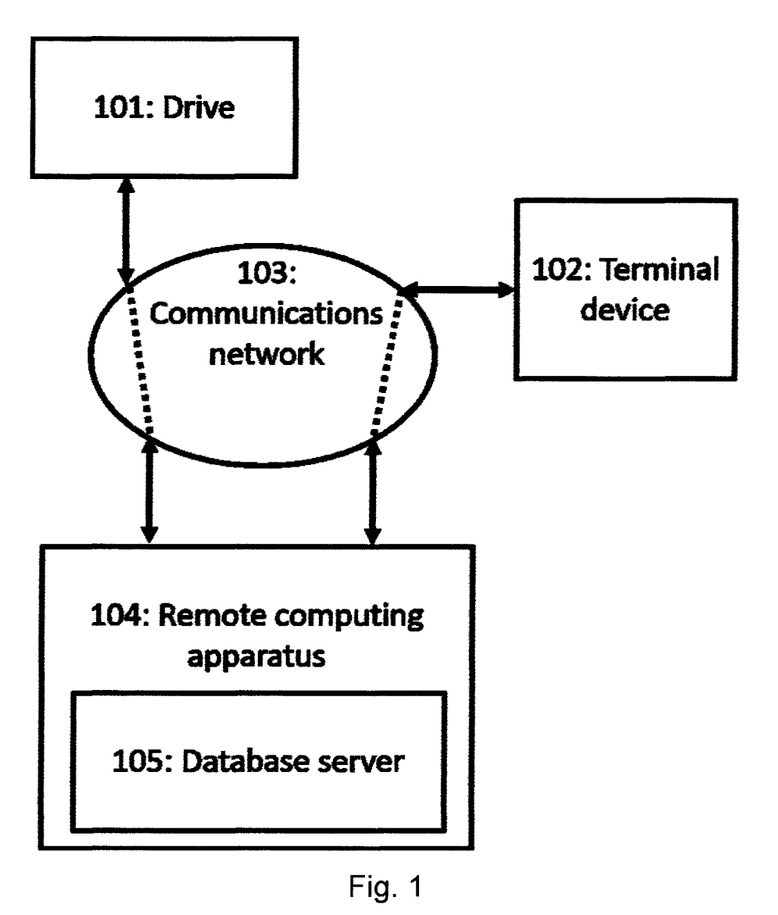
FIG. 1 illustrates a communication system to which embodiments of the invention may be applied.

A very general architecture of a communications system to which embodiments of the invention may be applied is illustrated in FIG. 1. FIG. 1 illustrates a simplified system architecture only showing some elements and functional entities, all being logical units whose implementation may differ from what is shown. The connections shown in FIG. 1 are logical connections; the actual physical connections may be different. It is apparent to a person skilled in the art that the systems also comprise other functions and structures.

FIG. 1 illustrates a communications system in which one or more drives 101 and a terminal device 102 are able to connect via a communications network 103 to a remote computing apparatus 104. It should be appreciated that FIG. 1 presents a simplified version of a practical system and that in other embodiments, a very large number of drives and possibly a plurality of terminal devices may be connected to the remote computing apparatus 104 via the communications network 103.

The communications network 103 may comprise one or more wireless networks, wherein a wireless network may be based on any mobile system, such as GSM, GPRS, LTE, 4G, 5G and beyond, and a wireless local area network, such as Wi-Fi. Furthermore, the communications network 103 may comprise one or more fixed networks or the internet.

The one or more drives 101 may be any devices which may be used to control the motion of machines (for example, a motor) by changing one or more drive parameters and which may be connected to the communications network 103. In the following, it is assumed that the one or more drives 101 are electrical drives (DC drives and/or AC drives supporting low to high voltages), though the embodiments of the invention may also be applied to hydraulic drives and/or mechanical drives. In an embodiment, the one or more drives 101 may be variable speed drives (VSD) or variable frequency drives (VFD). The one or more drives 101 may be connected to electrical machines driving industrial or non-industrial processes. The electrical machines may comprise AC or DC electrical motors which may run, for example, machines for transporting material, such as a pump, a fan, a compressor, a blower, a conveyor belt, a crane and/or an elevator and/or machines for processing materials, such as a paper machine, a mill, a stirrer and/or a centrifuge. The connections of the one or more drives 101 to the communications network 103 may be provided via wireless links using any standard wireless protocol, such as Bluetooth or Wi-Fi and/or wired links using any standard wired protocol such as Ethernet. The one or more drives 101 are able to exchange parameter settings with the remote computing apparatus 104 via the connection to the communication network 103. The one or more drives 101 may be similar to the extent that the drive parameters of each drive may have substantially similar form and describe substantially the same quantities.

The remote computing apparatus 104 may comprise a database server 105 and may also comprise one or more other network devices (not shown in FIG. 1), such as a terminal device, a server and/or a database. The remote computing apparatus 104 is configured to monitor the drive operation and communicate with the one or more drives 101 via the communications network 103. The database server 105 refers herein to a combination of a data storage (database) and a data management system. The data storage may be any kind of conventional or future data repository, including distributed and/or centralized storing of data, a cloud-based storage in a cloud environment, managed by any suitable data management system. The implementation of the data storage, the manner how data is stored, retrieved and updated are irrelevant to the invention, and therefore not described in detail here. Further, it should be appreciated that the location of the remote computing apparatus 104 is irrelevant to the invention. The remote computing apparatus 104 may be operated and maintained using one or more other network devices in the system or using the terminal device 102 via the communications network 103.

The database server 105 is assumed to maintain at least the drive registration data relating to the one or more drives 101 connected to the remote computing apparatus 104. The drive registration data may have been acquired, for example, via an online commissioning wizard for the drive, input by a user of the drive manually. The user of the drive may be able to modify the registration data after the initial registration. The drive registration data may comprise drive registration data objects relating to one or more of the following: the industry and/or the process for which the drive is being used, type and/or ratings of the motor connected to the drive, model of the drive, type and/or ratings of the gear box of the drive, the location of the drive and any other information relevant to the operation of the drive. Moreover, the database server 105 may comprise drive parameter data of the one or more drives 101 connected to the remote computing apparatus 104. Drive parameter data may comprise information on drive parameters such as torque, speed, power, voltage, frequency, speed ramp-up/ramp-down parameters, proportional-integral-derivative (PID) controller parameters, functional safety parameters and/or other parameters affecting the operation of the drive. Drive parameter data may further comprise variables relating to the drive environment, such as temperature and/or humidity. The process of collecting the drive parameter data from the one or more drives 101 is described in detail below in relation to FIGS. 2 and 3. It should be appreciated that while the drive registration data comprises information which is only indirectly related to the drive operation and may not necessarily be stored to any memory of the drive, the drive parameter data relates directly to the settings of the drive and is stored to a memory of the drive. The database 105 may also comprise past drive registration and/or drive parameter data for the one or more drives 101 if the drive registration and/or drive parameter data has been changed during the lifetime of the drive.

The terminal device 102 refers to a portable or non-portable computing device (equipment, apparatus) which is used for accessing, operating and maintaining the remote computing apparatus 104 and maintaining indirectly via the remote computing apparatus 104 also the drive 101. For example, the terminal device may be operated by the manufacturer of the drive. Computing devices (apparatuses) which may be employed include wireless mobile communication devices operating with or without a subscriber identification module (SIM) in hardware or in software, including, but not limited to, the following types of devices: desktop computer, laptop, touch screen computer, mobile phone, smart-phone, personal digital assistant (PDA), handset, e-reading device, tablet, game console, note-book, multimedia device, sensor, actuator, video camera, car, wearable computer, telemetry appliances, and telemonitoring appliances. The terminal device may comprise or be connected to a server or a database. In general, any suitable technology that makes it possible to communicate with the remote computing apparatus 104 via the communications network 103 may be utilized. In some embodiments, the terminal device may be able to connect via the communications network 103 directly to the drive and/or the terminal device 102 may be comprised in the remote computing apparatus 104.

Figure 2:
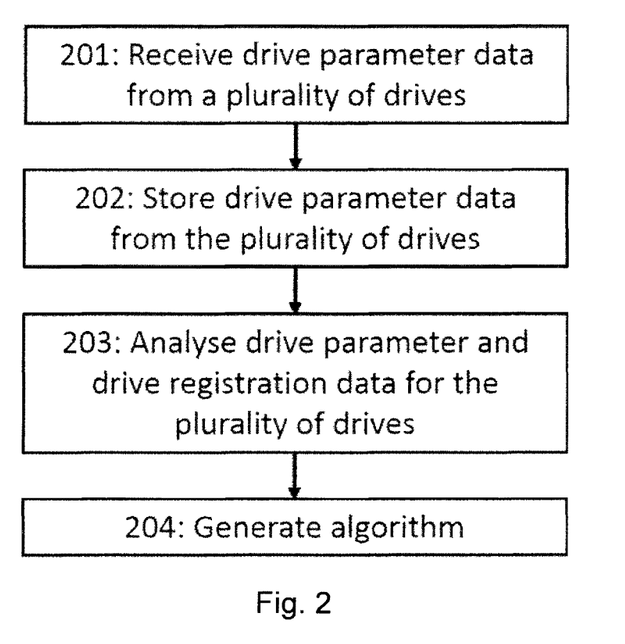
FIGS. 2, 4, 6 and 7 are flow charts illustrating exemplary functionalities.

FIG. 2 is a flow diagram according to an embodiment of the invention, illustrating a process for analyzing the drive parameter data from a plurality of drives, executed by the remote computing apparatus. It is assumed that the plurality of drives are connected via the communications network to the remote computing apparatus as illustrated in and described in relation to FIG. 1 for one or more drives. The database server comprised in the remote computing apparatus is assumed to maintain drive registration data acquired during the commissioning of each of the plurality of drives. It is further assumed that the drive registration data corresponding to the plurality of drives is up-to-date.

Referring to FIG. 2, the remote computing apparatus receives, in block 201, drive parameter data transmitted from a plurality of drives via the communications network. The remote computing apparatus stores, in block 202, the drive parameter data from the plurality of drives to the database server. Next, the remote computing apparatus analyses, in block 203, the drive registration data and the drive parameter data corresponding to the plurality of drives in order to obtain correlations between drive registration data objects and drive parameters. Based on the analyzing, the remote computing apparatus generates, in block 204, an algorithm for estimating expected optimal drive parameters based on at least drive registration data and/or for determining expected drive registration data object values based on at least optimal drive parameters for a drive.

In some embodiments, the plurality of drives may all be operating optimally. In other words, the data may be collected only from drives which are known to be configured correctly, for example, they may have been configured by the manufacturer of the drive. However, in other embodiments, this may not be the case. The remote computing apparatus may receive, in block 201, drive parameter data transmitted from a plurality of drives some of which may not be operating optimally. However, if most of the plurality of drives have optimal or close to optimal drive parameters and the number of the plurality of drives is sufficiently large, analyzing the data as described above still gives dependable results for estimating optimal drive parameters. In some embodiments, the remote computing apparatus may also be configured to perform pre-filtering for the collected drive parameter data such that the drive parameters which are clearly incorrect (for example, appearing as clear outliers in the data) are not taken into account in the consequent analysis.

Said generating of the algorithm, in block 204, may comprise initializing and/or calibrating a pre-written algorithm stored in the database server or elsewhere in the remote computing apparatus, based on the analysis in block 203. The algorithm may also take as an input one or more current drive parameters assumed to be optimal when calculating expected optimal drive parameters and/or one or more drive registration data objects when determining an expected value for a drive registration data object. The algorithm may be used by the remote computing apparatus for each requested computation directly, that is, a runtime computation may be performed. Alternatively, the remote computing apparatus may calculate and store the solutions for a plurality of drive parameter data/drive registration data combinations after the initialization step to be used as a lookup table for facilitating the calculations relating to later computation requests. The term "calculated using the algorithm" should in the following text be understood to encompass also the option of using the pre-calculated lookup table for the calculation if one has been created. In some embodiments, the algorithm may comprise multiple sub-algorithms for different applications and scenarios. In an embodiment, the algorithm is an algorithm for or comprises a sub-algorithm for determining expected process type based on the drive parameters and optionally one or more drive registration data objects excluding the process type data.

Figure 3:
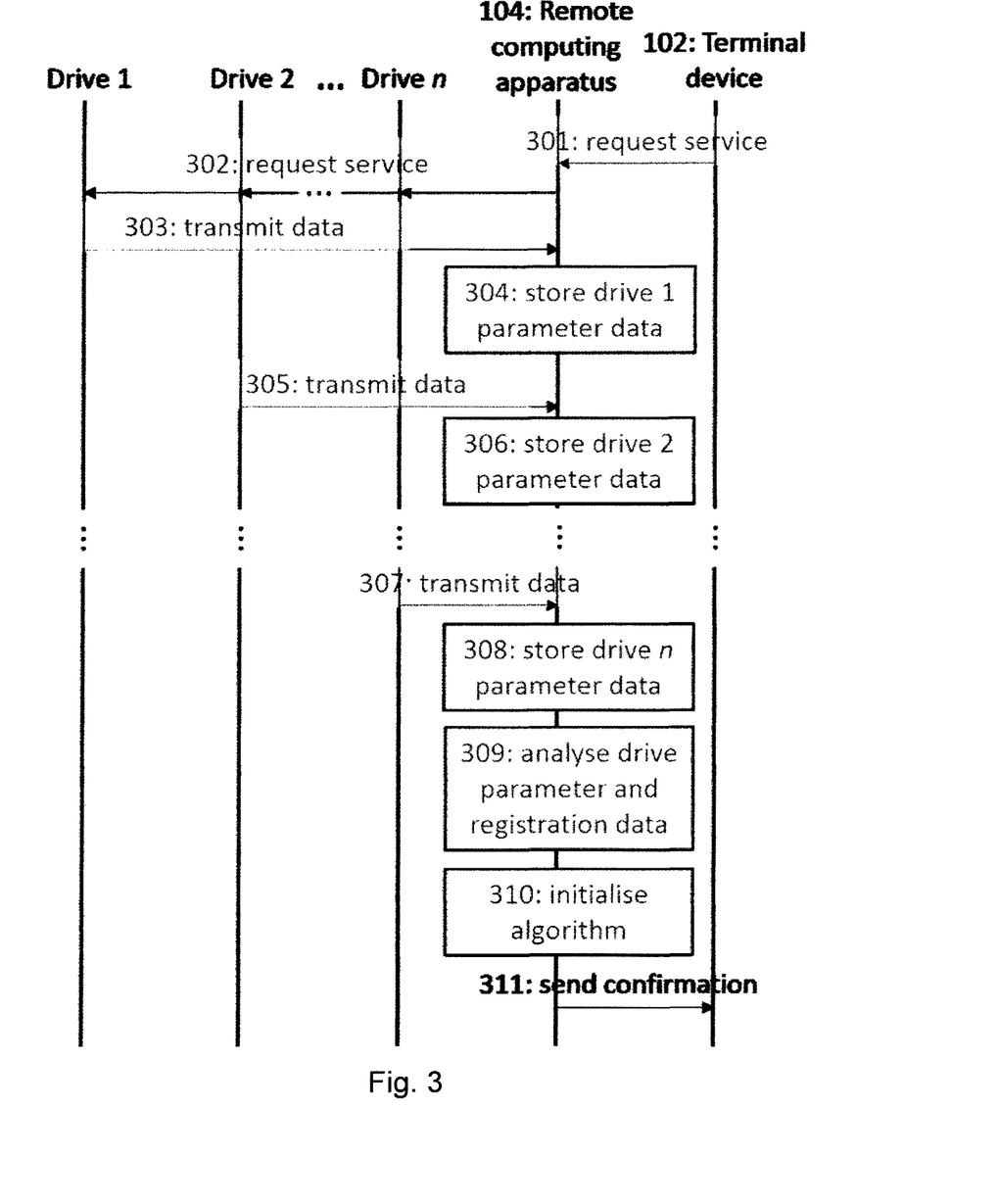
FIGS. 3, 5 and 8 are signaling diagrams illustrating exemplary information exchanges.

FIG. 3 discloses a signaling diagram illustrating a process for collecting and analyzing the drive parameter data from a plurality of drives (drive 1, drive 2, . . . , drive n) 320, 320, 340. In this example, it is assumed that a pre-written algorithm which requires correlation analysis results for initialization/calibration is stored in the database server or elsewhere in the remote computing apparatus 104. The process proceeds as follows. First, a terminal device 102 sends a service request message 301 to the remote computing apparatus 104. Consequently, the remote computing apparatus 104 sends a service request message 302 to each of the drives 1, 2, . . . and n. In response to this request, each of the drives sends their current drive parameters to the remote computing apparatus 104, messages 303, 305, 307, and the remote computing apparatus 104 receives the messages and stores the parameters, in blocks 304, 306, 308, to the database server. It should be appreciated that the order in which the drives send their drive parameter data to the remote computing apparatus 104 is arbitrary. As described in detail above in relation to FIG. 2, the remote computing apparatus 104 analyses the drive parameter data and drive registration data for correlation and initializes the algorithm in blocks 309, 310, respectively. Finally, the remote computing apparatus 104 sends a confirmation message 311 to the terminal device 102.

In an embodiment, the process of FIG. 2 or 3 may be triggered automatically by the remote computing apparatus. In said embodiment, the first and last signaling steps of FIG. 3, i.e., steps 301, 311, are excluded. The remote computing apparatus may also be configured to repeat the process according to said embodiment periodically. In another embodiment, the drives may send their drive parameters to the remote computing apparatus periodically based on a first timer whereas the drive parameter data is analyzed and the algorithm is generated in the remote computing apparatus according to the process illustrated in FIG. 2 periodically based on a second timer. In some embodiments, the remote computing apparatus may request the current drive parameters only for certain drives, for example, for drives which have been commissioned and connected to the remote computing apparatus only recently. The process may also be initiated by a terminal device connected via the communications network to or comprised in the remote computing apparatus.

Once the remote computing apparatus has been setup by generating the algorithm for estimating expected optimal drive parameters based on at least drive registration data for a drive and for determining expected drive registration data object values based on at least optimal drive parameters for a drive, the remote computing apparatus may be configured to utilize the algorithm in several different ways in order to monitor and maintain the drives connected to it.

Figure 4:
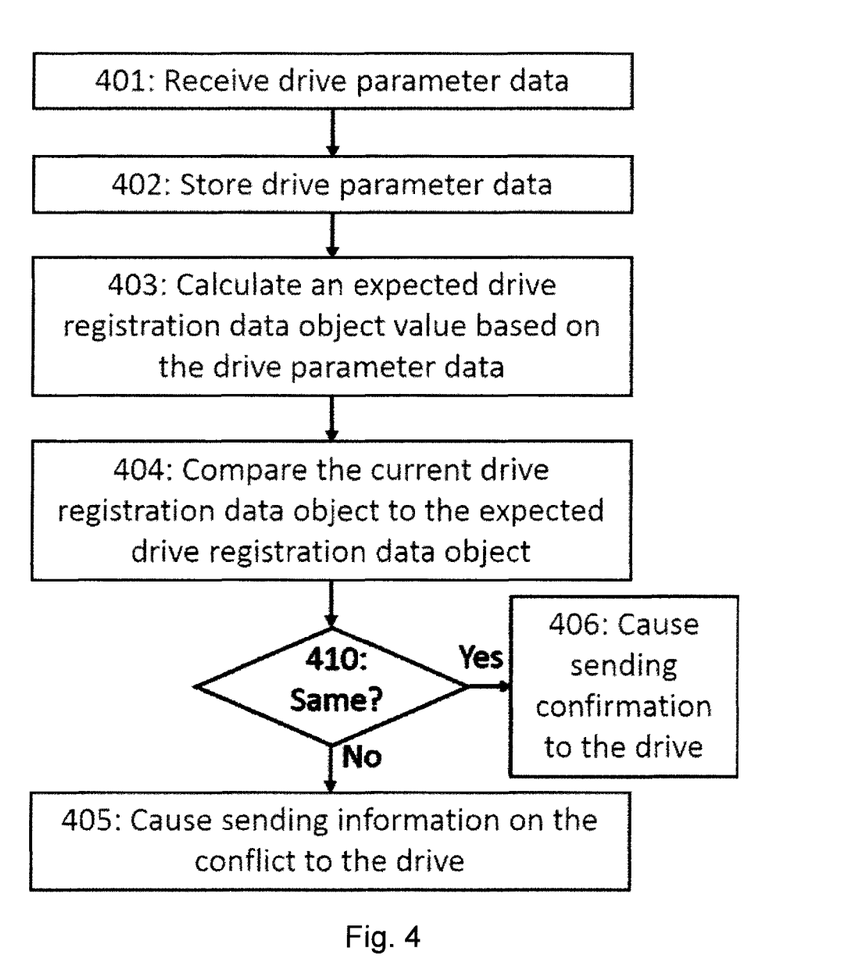
Figure 5:
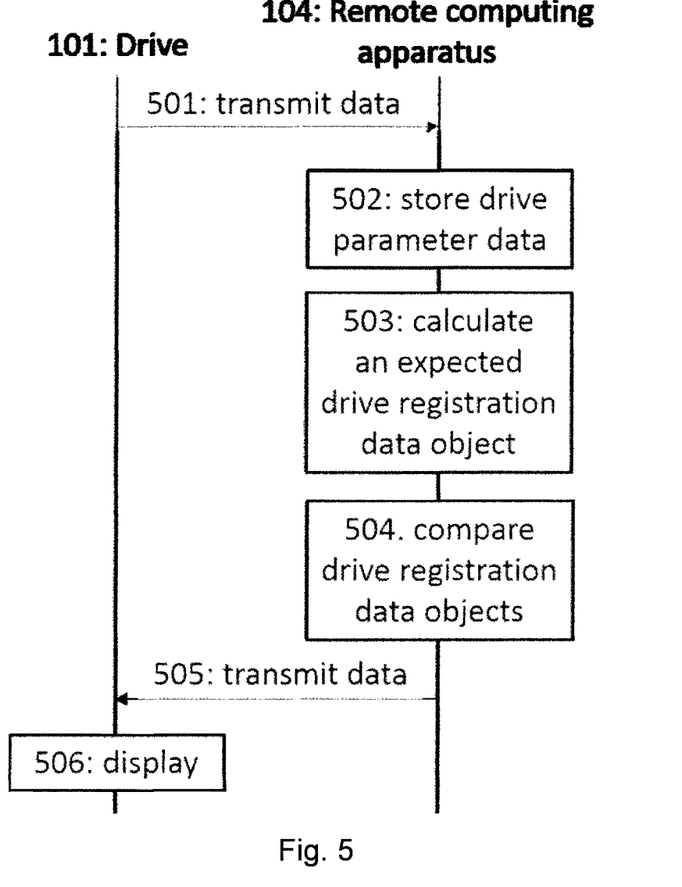

An embodiment of the invention relates to verifying a drive registration data object value of a drive based on the drive parameters of the drive as illustrated in the flow diagram of FIG. 4 and the signaling diagram of FIG. 5. The method may be applied to any of the drive registration data objects listed in relation to FIG. 1. In the embodiment, it is assumed that the drive is operating optimally or close to optimally, that is, the drive parameters of the drive correspond substantially to optimal drive parameters and the database server comprised in the remote computing apparatus maintains at least drive registration data corresponding to the drive. Furthermore, it is assumed that an algorithm and/or a lookup table generated according to the method described above in relation to FIGS. 2 and 3 is stored to the remote computing apparatus. The algorithm is an algorithm for or comprises a sub-algorithm for determining an expected value of a drive registration data object based on the drive parameters. In an embodiment, the algorithm may take as its input, in addition to the drive parameters, one or more drive registration data object values excluding the drive registration data object value to be verified. The lookup table is a lookup table generated by using said algorithm or sub-algorithm with a plurality of drive parameter data sets.

Referring to FIG. 4, the remote computing apparatus 430 receives, in block 401, drive parameter data transmitted from the drive 420 via the communications network. Based on receiving the drive parameter data, the remote computing apparatus stores, in block 402, the drive parameter data to the database server. The remote computing apparatus calculates, in block 403, an expected drive registration data object value for the drive using the algorithm based on at least the drive parameter data. Next, the remote computing apparatus compares, in block 404, the expected drive registration data object value to the corresponding drive registration data object value included in the drive registration data for the drive. If the two values differ from each other in block 410, the remote computing apparatus sends, in block 405, information on the conflicting drive registration data object value via the communications network to the drive. If the two values are in block 410 the same or close to each other according to a pre-defined margin of error based on the comparing, depending on the type of the compared drive registration data object, the remote computing apparatus sends, in block 406, a confirmation message via the communications network to the drive. For example, for drive registration data objects with non-numeric values (for example, process or motor type) an exact match may be required but for drive registration data objects defined as numeric values (for example, motor or gear box ratings) certain pre-defined margin of error may be allowed in the comparing. In an embodiment, the remote computing apparatus may also send the information on the conflicting drive registration data object value and the confirmation message to a terminal device connected to the remote computing apparatus. In an embodiment, the process is repeated periodically for each drive connected to the remote computing apparatus. The process may also be initiated by a user of the drive or a user of the terminal device connected to or comprised in the remote computing apparatus by a sending a service request to the remote computing apparatus.

FIG. 5 discloses an exemplary signaling diagram illustrating the verification of the drive registration data object value of the drive 101 based on drive parameters of the drive 101. First, the drive 101 sends drive parameter data to the remote computing apparatus 104 in message 501. The actions relating to blocks 502 to 504 corresponding to those described above in relation to blocks 402 to 405 and 410 of FIG. 4 and are, therefore, not repeated here for brevity. It is assumed in this example that the remote computing apparatus 104 detects a conflict between the drive registration data object stored in the database server and the expected drive registration data object based on the drive parameters. Therefore, the message 505 from the remote computing apparatus 104 to the drive 101 comprises information on the conflicting drive registration data object. Upon receiving the information on the conflicting drive registration data object, the drive 101 outputs, in block 506, the information on the conflicting drive registration data object value via the drive user interface, for example, via a display. For example, it may be displayed which drive registration data object has an unexpected value and what the current and expected values are for said drive registration data object. In an embodiment, the drive and its user interface may also provide an option to change the drive registration data object value upon an input by the user of the drive to match the expected drive registration data object value. If the user provides an input confirming the expected drive registration data object value, the drive may send a confirmation message to the remote computing apparatus which may, upon receiving the confirmation message, update the drive registration data stored in the database server accordingly, as described below in more detail in relation to FIGS. 6 to 8.

In an embodiment, the drive registration data object which is verified using the method described in relation to FIGS. 4 and 5 relates to a process type of the drive. As described above in relation to FIG. 2, the algorithm may be an algorithm for or comprises a sub-algorithm for determining an expected process type based on the drive parameters and optionally one or more drive registration data objects. For example, the one or more drive registration data objects may relate to the motor type of the drive, the industry for which the drive is used and/or any other registration information which may have an effect on the optimal drive parameters of the drive driving a particular process.

In above embodiments described in relation to FIGS. 4 and 5, it was assumed that the drive was operating optimally or close to optimally. In another embodiment, the drive may not be necessarily operating optimally. In such a case, the user should be informed not only of the conflicting drive registration object but also of the expected optimal drive parameter data for the current drive registration data in order to help the user to decide on the correct of course of action. To that end, the remote computing apparatus may calculate in block 403 or 503, in addition to the expected drive registration data object, the expected optimal drive parameters for the drive using the algorithm based on the drive registration data of the drive stored to the database. This additional data may be sent in block 405 or message 505 back to the drive and the drive may display this data to the user (block 506). If the drive registration data object is clearly wrongly defined as suggested by the remote computing apparatus, this additional information is not needed. However, if the drive registration data object is correctly defined, this additional information allows the user to more fully analyze which drive parameters differ from the expected optimal drive parameters and are therefore responsible for the remote computing apparatus detecting a conflicting drive registration data object value. Using this information, the user is able to make a better judgement on whether the drive parameters are, in fact, configured incorrectly and if they are, which parameters should be changed to improve performance. On the other hand, it may be possible that the drive is configured correctly, but the drive parameters for that particular drive and process simply have atypical optimal values compared to most similar drives in similar processes. The drive and its user interface may also provide an option to change the drive parameter data upon an input by the user of the drive to match the expected optimal drive parameter data.

Figure 7:
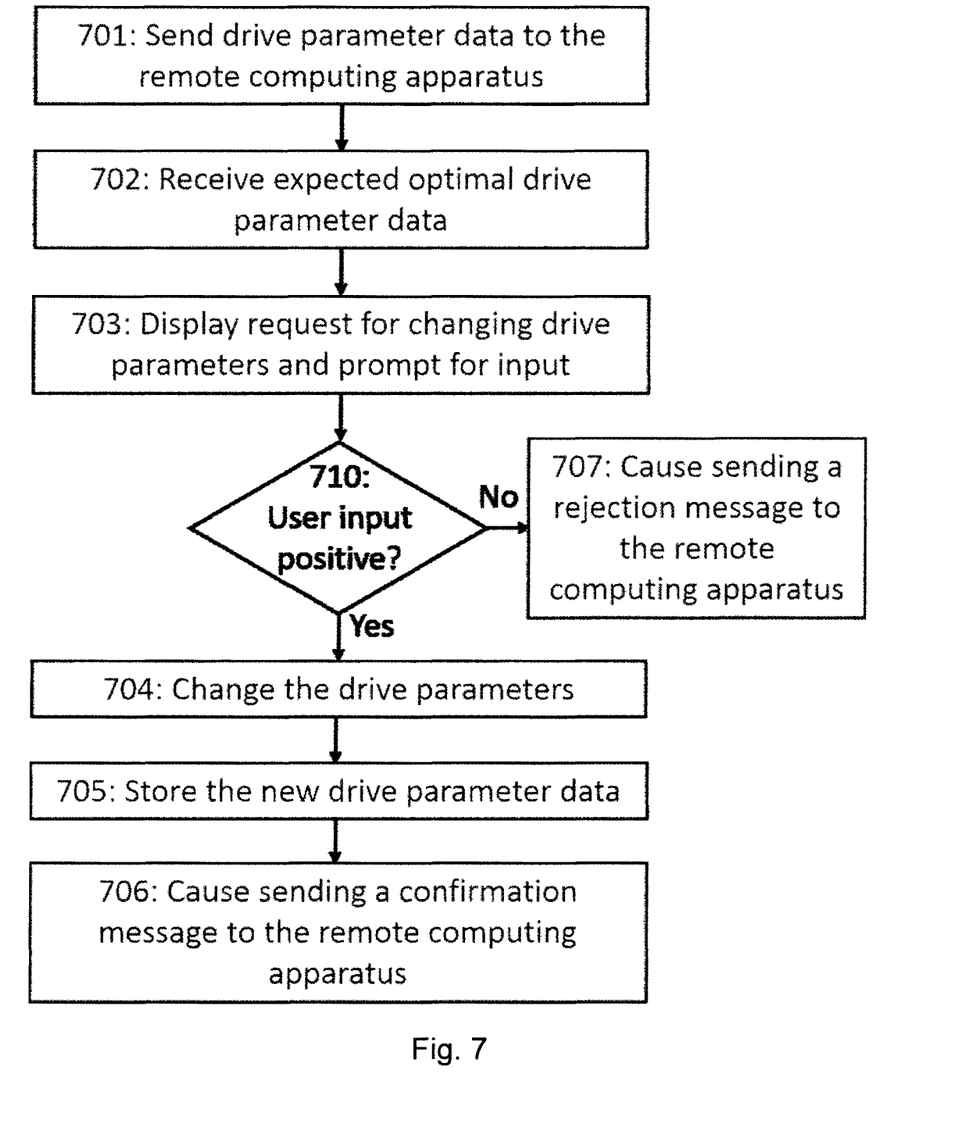
Figure 8:
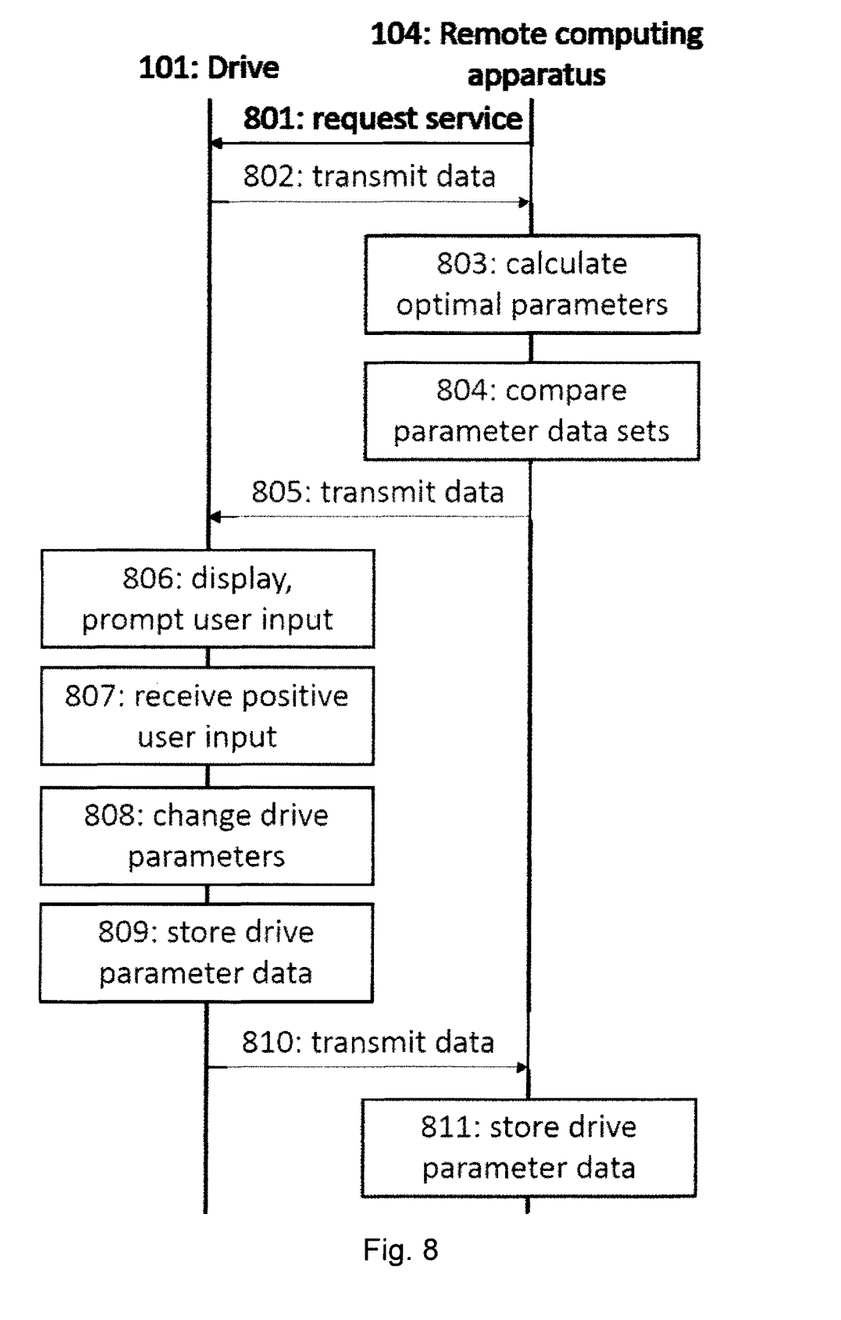

The remote computing apparatus may also be configured to utilize the algorithm generated by the remote computing apparatus in an alternative, converse way. Instead of calculating an expected drive registration data object value based on the drive parameters, the remote computing apparatus may be configured to use the algorithm to calculate the expected optimal drive parameters based on the drive registration data. Embodiments of the invention realizing this alternative process are illustrated in FIGS. 6 to 8.

Figure 6:
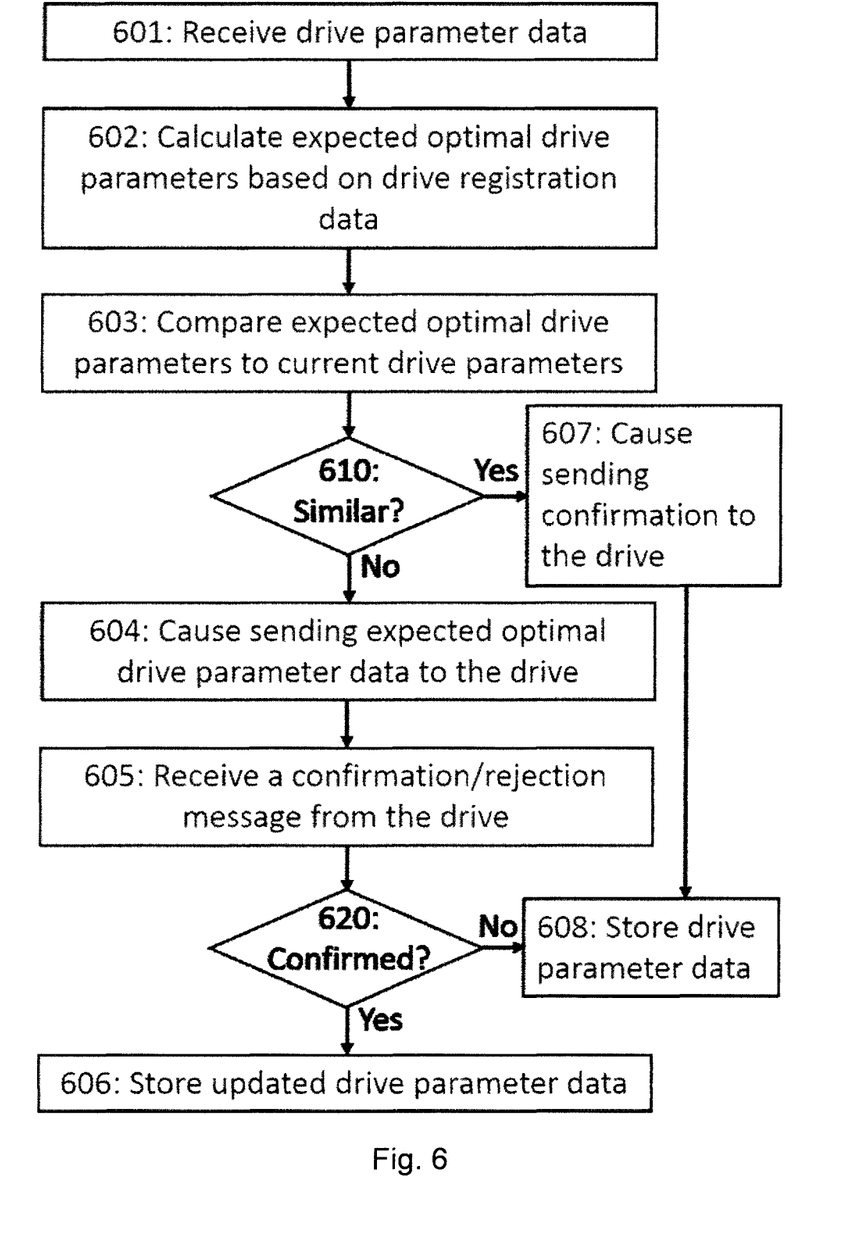

In FIG. 6, the process for calculating the expected optimal drive parameters based on the drive registration data executed by the remote computing apparatus is illustrated. In contrast to the embodiment illustrated in FIGS. 4 and 5, the drive may or may not be operating optimally, that is, the drive parameters do not necessarily correspond substantially to the optimal drive parameters. However, it is assumed that the drive registration data stored in the database server of the remote computing apparatus is up-to-date. Moreover, it is assumed that the process is initiated automatically by the drive due to a timer expiring or upon an input by the user of the drive. Similar to the embodiment illustrated in FIGS. 4 and 5, it is assumed that the database server comprises drive registration data corresponding to the drive and that an algorithm and/or a lookup table generated according to the method described above in relation to FIGS. 2 and 3 is stored to the remote computing apparatus. The algorithm is an algorithm for or comprises a sub-algorithm for determining an expected optimal drive parameters based on the drive registration data. In an embodiment, the algorithm may take as its input, in addition to the drive registration data, one or more drive parameters. The lookup table is a lookup table generated by using said algorithm or sub-algorithm with a plurality of drive registration data sets.

First, the remote computing apparatus receives, in block 601, drive parameter data transmitted from a drive via the communications network. The remote computing apparatus calculates, in block 602, expected drive parameters for the drive using the algorithm based on the drive registration data for the drive. The algorithm may also use one or more drive parameters in the calculation in which case the expected optimal drive parameters are calculated assuming that the one or more drive parameters already have optimal values. Next, the remote computing apparatus compares, in block 603, the expected optimal drive parameters to the received current drive parameters of the drive. If the two set of parameters deviate according to a threshold defined in an algorithm for assessing a deviation between two sets of variables in block 610, the remote computing apparatus sends, in block 604, the expected optimal drive parameter data via the communications network to the drive. If the two sets of parameters are within the threshold in block 610, the remote computing apparatus sends, in block 607, a confirmation message via the communications network to the drive and stores the drive parameter data received in block 601 to the database server. The algorithm for assessing the deviation between two sets of variables may be stored in the database server or elsewhere in the remote computing apparatus. For example, the algorithm for assessing a deviation between two sets of variables may calculate a root-mean-square deviation (RMSD) or a normalized root-mean-square deviation (NRMSD) for each drive parameter. Then, the algorithm may calculate the weighted average of the RMSD or NRMSD values, and the threshold may be defined as a threshold for this averaged quantity.

After sending the expected optimal drive parameters, the remote computing apparatus receives, in block 605, a message from the drive containing information on whether the user of the drive has confirmed or rejected the expected optimal drive parameters as the new drive parameters. If, in block 620, the message is a confirmation message, the expected optimal drive parameter data is stored, in block 606, to the database server as the current drive parameter data for the drive. If, in block 620, the message is a rejection message, the drive parameter data received in block 601 is stored, in block 608, to the database server as the current drive parameter data for the drive.

In addition to the processes for checking whether drives are configured optimally illustrated in FIGS. 6 to 8, the remote computing apparatus may also be configured to provide each drive the expected optimal drive parameters during the commissioning of the drive. Once the user has completed drive registration using the drive itself (via the drive user interface) or a terminal device such as a personal computer, the remote computing apparatus may automatically send a request for changing the drive parameters to match the expected optimal drive parameters corresponding to the provided drive registration data to the drive. The request may comprise the expected optimal drive parameter data. If the user provides a positive input to a prompt requesting the changing of the drive parameters, the drive may change the drive parameters to match the expected optimal drive parameters.

FIG. 7 illustrates a process, executed in the drive, for checking whether the current drive parameters are optimal and modifying the drive parameters if necessary. In this example, it is assumed that the drive parameters for the drive are not initially set optimally. Therefore, upon sending, in block 701, the drive parameter data to the remote computing apparatus, the expected optimal drive parameters are received, in block 702, from the remote computing apparatus. Consequently, the drive outputs, in block 703, via a drive user interface a request for changing the drive parameters of the drive to match the expected optimal drive parameters and prompts for an input from the user. If a positive user input to the request is received, in block 710, the drive updates, in block 704, the drive parameters to match the expected optimal drive parameters and stores, in block 705, the updated drive parameters to the drive. The drive may send, in block 706, a confirmation message to the remote computing apparatus. If a negative user input is received, in block 710, the drive may send, in block 707, a message via the communications network informing the remote computing apparatus that the request for changing the drive parameters has been rejected by the drive.

An embodiment relating to a process for calculating expected optimal drive parameters of a drive 820 by the remote computing apparatus 104 based on drive registration data and changing drive parameters of the drive 820 is illustrated in FIG. 8. It is assumed in this example that the drive parameters of the drive 820 are not initially set optimally and that the user of the drive 820 is willing to change the drive parameters if so requested. The process corresponds to the one described in relation to FIGS. 6 and 7. The actions relating to blocks 803, 804 and 811 correspond to blocks 602, 603 and 610 and 606 of FIG. 6, respectively, and the actions relating to blocks 806, 807, 808 and 809 correspond to blocks 703, 710, 704 and 705 of FIG. 7, respectively. The detailed descriptions of said actions will not be repeated here in full for brevity.

Referring to FIG. 8, the remote computing apparatus 104 initiates the process by sending a service request message 801 to the drive 820 (in contrast to the drive 820 triggering the process as in relation to FIGS. 6 and 7). The service request may be triggered automatically due to a timer expiring or by a request from a terminal device connected to or comprised in the remote computing apparatus 104. Upon receiving the service request, the drive 101 sends the drive parameter data in message 802 to the remote computing apparatus 104. Upon receiving the drive parameter data, the remote computing apparatus 104 calculates, in block 803, the expected optimal drive parameters. If, in block 804, the expected optimal drive parameters are deemed to be dissimilar to the current drive parameters by the remote computing apparatus 104, the remote computing apparatus sends the expected optimal drive parameters to the drive 101 in message 805. Upon receiving the expected optimal drive parameters, the drive 101 displays, in block 806, them via the drive user interface and prompts the user for input. Once a user input for confirming the changing of the drive parameters is received, in block 807, in the drive 101, the parameters are changed, in block 807, and stored, in block 808, to a memory of the drive. A confirmation message 809 may be sent from the drive 820 to the remote computing apparatus 104. Upon receiving the confirmation message 809, the remote computing apparatus 104 may store, in block 811, the updated drive parameters, that is, the expected optimal drive parameters, to the database server.

An embodiment relating to the method described in relation to any of FIGS. 6 to 8 may be repeated periodically according to a timer or timers for each drive connected to the remote computing apparatus. As described in FIGS. 6 and 7 and FIG. 8, respectively, the process may be initiated upon a request by the user of the drive or by the remote computing apparatus itself. In an embodiment, the process is automatically initiated during the commissioning of the drive as the user defines at least the process and motor type relating to the drive in an online commissioning wizard. Moreover, the process may be automatically repeated if the drive parameters are changed manually by the user of the drive using the drive user interface. A terminal device connected to or comprised in the remote computing apparatus may also send a request for initiating the process which the remote computing apparatus may forward via the communications network to the drive. The steps/or and information exchanges described above by means of FIGS. 2 to 8 are in no absolute chronological order, and some of them may be performed simultaneously or in an order differing from the given one. Furthermore, the methods relating to FIGS. 4 and 5 and FIGS. 6 to 8, respectively, may be performed simultaneously with each other and simultaneously for multiple drives connected to the remote computing apparatus via the communications network. In some embodiments, multiple communications networks may be used simultaneously for providing communication between a plurality of drives and the remote computing apparatus and/or between one or more terminal devices and the remote computing apparatus. For example, the method illustrated in FIGS. 2 and 3 for analyzing the drive parameter data from a plurality of drives by the remote computing apparatus may be conducted periodically while at least one of the methods relating to FIGS. 4 and 5 or FIGS. 6 to 8 is also running, possibly also periodically. Some of the steps and information exchanges illustrated in FIGS. 2 to 8 may be left out in some instances. For example, the remote computing apparatus may not store the drive parameter data to the database server in block 402 of FIG. 4 or block 502 of FIG. 5 every time the process is run.

An exemplary method and apparatus enables a better user experience as the manufacturer of the drive operating the remote computing apparatus is able to notify the user if the drive is not commissioned correctly and also to propose optimal parameter settings for the specific use case. Furthermore, if the drive is moved from one process to another and the drive parameters are tuned for optimal operation manually, the manufacturer of the drive may be automatically informed of the change in the process type for which the drive is used. The drive parameter data collected periodically to the remote computing apparatus in the embodiments may also be used by the manufacturer of the drive for further analyses, for example, for studying the lifetime and failure rate of different drive types in different processes and/or time-evolution of the drive parameter values. This information may be further used to create a drive selection tool to find the optimal drive for each specific application, for example, in terms of price, performance and/or lifetime.

Figure 9:
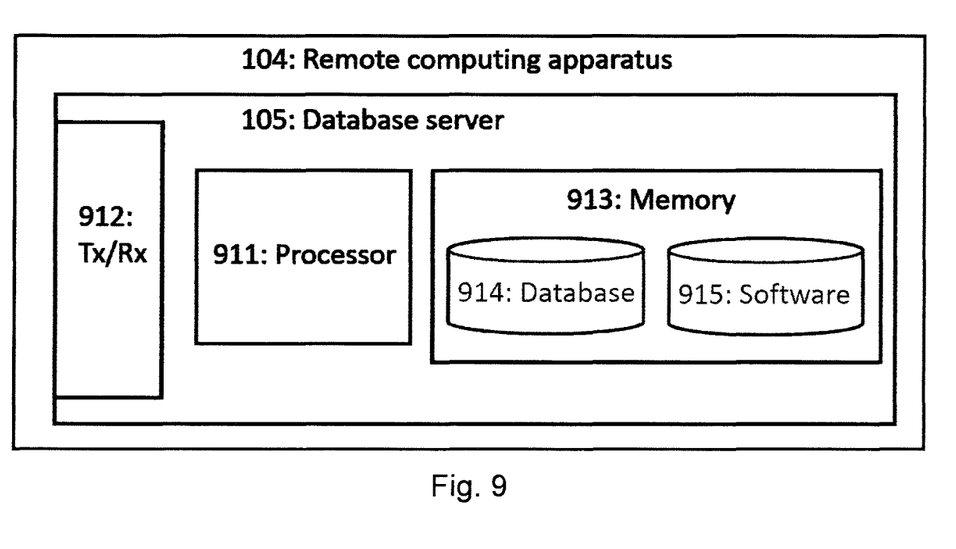
FIGS. 9 and 10 illustrate exemplary apparatuses.

FIG. 9 provides an apparatus according to some embodiments of the invention. FIG. 9 illustrates an exemplary apparatus configured to carry out the functions described above in connection with the remote computing apparatus 104. The apparatus (the remote computing apparatus) 104 may be a separate network entity or a plurality of separate entities. The apparatus 104 comprises a database server 105 and may also comprise one or more other network devices (not shown in FIG. 9) such as terminal devices, servers or databases. The functions described above in connection with the remote computing apparatus 104 may be carried out by the database server or the one or more other network devices comprised in the remote computing apparatus in conjunction with the database server. The database server 105 may comprise one or more communication control circuitries, such as at least one processor 911 and at least one memory 913, including a computer program code (software) 915, wherein the at least one memory and the computer program code (software) are configured, with the at least one processor, to cause the apparatus to carry out any one of the exemplified functionalities of the remote computing apparatus. The database server may further comprise one or more communication interfaces 912, such as a radio interface and an Ethernet interface.

The memory 913 or part of it may be implemented using any suitable data storage technology, such as semiconductor based memory devices, flash memory, magnetic memory devices and systems, optical memory devices and systems, fixed memory and removable memory. The memory may comprise a database 914 which may comprise a drive registration database maintaining drive registration data for the drives connected to the remote computing apparatus as described in previous embodiments. Moreover, the database may comprise a drive parameter database maintaining drive parameters for the drives connected to the remote computing apparatus. The memory 903 may further comprise an algorithm for determining expected drive registration data object values based on drive parameter data and for estimating expected optimal drive parameters based on drive registration data, an algorithm for initializing/calibrating said algorithm based on the data stored in the database 914 and/or an algorithm for assessing a deviation between two sets of variables. The memory 903 may also comprise a lookup table corresponding to the algorithm for determining expected drive registration data object values based on drive parameter data and for estimating expected optimal drive parameters based on drive registration data. The memory 904 may also comprise other databases which may not be related to drive parameter or drive registration data.

Figure 10:
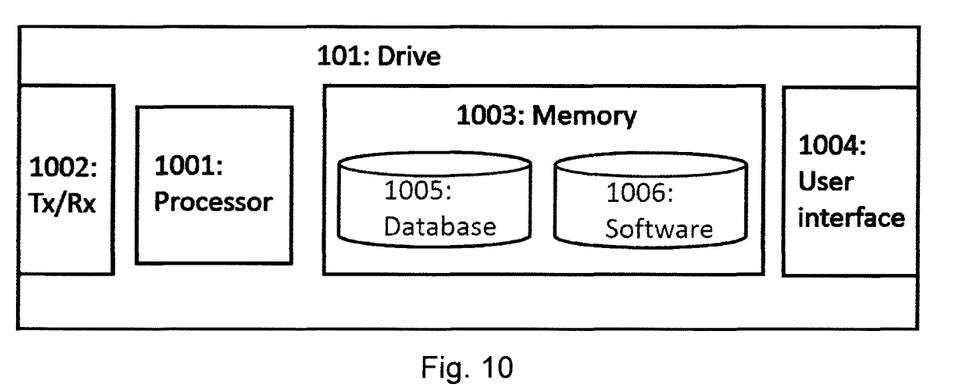

FIG. 10 provides an apparatus according to some embodiments of the invention. FIG. 10 illustrates an apparatus configured to carry out the functions described above in connection with the drive. The apparatus 101 may comprise one or more communication control circuitries, such as at least one processor 1001, and at least one memory 1003, including one or more algorithms 1006, such as a computer program code (software) wherein the at least one memory and the computer program code (software) are configured, with the at least one processor, to cause the apparatus to carry out any one of the exemplified functionalities of the drive. The memory 1003 may also comprise a database 1005 which may maintain drive parameter data of the drive. The apparatus may further comprise one or more communication interfaces 1002, such as a radio interface and an Ethernet interface, and one or more user interfaces 1004. One or more user interfaces 1004 may comprise any kind of a user interface, for example a screen, a set of buttons and dials, microphone and one or more loudspeakers for interaction with the user. The memory 1003 or part of it may be implemented using any suitable data storage technology, such as semiconductor based memory devices, flash memory, magnetic memory devices and systems, optical memory devices and systems, fixed memory and removable memory.

The one or more communication interfaces (Tx/Rx) 912, 1002 may comprise hardware and/or software for realizing communication connectivity according to one or more communication protocols. The communication interface may provide the apparatus with communication capabilities to communicate over a local connection and/or local connections and/or in a cellular communication system and/or in a fixed network, and enable communication between different apparatuses. The communication interface 902, 1002 may comprise standard well-known components such as an amplifier, filter, frequency-converter, (de)modulator, and encoder/decoder circuitries and one or more antennas. The communication interfaces 902, 1002 may comprise radio interface components and/or other wireless interface components providing the apparatus with wireless communication capability. The communication interfaces 902, 1002 may provide connection to the communications network.

As used in this application, the term 'circuitry' refers to all of the following: (a) hardware-only circuit implementations, such as implementations in only analog and/or digital circuitry, and (b) combinations of circuits and soft-ware (and/or firmware), such as (as applicable): (i) a combination of processor(s) or (ii) portions of processor(s)/software including digital signal processor(s), software, and memory(ies) that work together to cause an apparatus to perform various functions, and (c) circuits, such as a microprocessor(s) or a portion of a microprocessor(s), that require software or firmware for operation, even if the software or firmware is not physically present. This definition of 'circuitry' applies to all uses of this term in this application. As a further example, as used in this application, the term 'circuitry' may also cover an implementation of merely a processor (or multiple processors) or a portion of a processor and its (or their) accompanying software and/or firmware. The term 'circuitry' may also cover, for example and if applicable to the particular element, a baseband integrated circuit or applications processor integrated circuit for a mobile phone or a similar integrated circuit in a server, a cellular network device, or another network device.

In an embodiment, at least some of the processes described in connection with FIGS. 2 to 8 may be carried out by an apparatus comprising corresponding means for carrying out at least some of the described processes. Some example means for carrying out the processes may include at least one of the following: detector, processor (including dual-core and multiple-core processors), digital signal processor, controller, receiver, transmitter, encoder, decoder, memory, RAM, ROM, software, firmware, display, user interface, display circuitry, user interface circuitry, user interface software, display software, circuit, antenna, antenna circuitry, and circuitry. In an embodiment, the at least one processor, the memory, and the computer program code form processing means or comprises one or more computer program code portions for carrying out one or more operations according to any one of the embodiments of FIGS. 2 to 8 or operations thereof.

The techniques and methods described herein may be implemented by various means. For example, these techniques may be implemented in hardware (one or more devices), firmware (one or more devices), software (one or more modules), or combinations thereof. For a hardware implementation, the apparatus(es) of embodiments may be implemented within one or more application-specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a combination thereof. For firmware or software, the implementation can be carried out through modules of at least one chipset (procedures, functions, and so on) that perform the functions described herein. The software codes may be stored in a memory unit and executed by processors. The memory unit may be implemented within the processor or externally to the processor. In the latter case, it can be communicatively coupled to the processor via various means, as is known in the art. Additionally, the components of the systems described herein may be rearranged and/or complemented by additional components in order to facilitate the achievements of the various aspects, etc., described with regard thereto, and they are not limited to the precise configurations set forth in the given figures, as will be appreciated by one skilled in the art.

In an embodiment, the at least one processor, the memory, and the computer program code form processing means or comprises one or more computer program code portions for carrying out one or more operations according to any one of the embodiments of FIGS. 2 to 8 or operations thereof.

Embodiments as described may also be carried out in the form of a computer process defined by a computer program or portions thereof. Embodiments of the methods described in connection with FIGS. 2 to 8 may be carried out by executing at least one portion of a computer program comprising corresponding instructions. The computer program may be in source code form, object code form, or in some intermediate form, and it may be stored in some sort of carrier, which may be any entity or device capable of carrying the program. For example, the computer program may be stored on a computer program distribution medium readable by a computer or a processor. The computer program medium may be, for example but not limited to, a record medium, computer memory, read-only memory, electrical carrier signal, telecommunications signal, and software distribution package, for example. The computer program medium may be a non-transitory medium. Coding of software for carrying out the embodiments as shown and described is well within the scope of a person of ordinary skill in the art.

Even though the invention has been described above with reference to examples according to the accompanying drawings, it is clear that the invention is not restricted thereto but can be modified in several ways within the scope of the appended claims. Therefore, all words and expressions should be interpreted broadly and they are intended to illustrate, not to restrict, the embodiment. It will be obvious to a person skilled in the art that, as technology advances, the inventive concept can be implemented in various ways. Further, it is clear to a person skilled in the art that the described embodiments may, but are not required to, be combined with other embodiments in various ways.

It will be obvious to a person skilled in the art that, as the technology advances, the inventive concept can be implemented in various ways. The invention and its embodiments are not limited to the examples described above but may vary within the scope of the claims.

The invention claimed is:

1. A method of drive registration data verification, the method comprising:
commissioning a drive for operation in a specific application including operatively coupling a drive with an electrical machine;
operating the drive to supply electrical power to the electrical machine according to drive parameters stored in a non-transitory memory of the drive, the drive parameters corresponding to optimal parameters for operation of the drive;
receiving, in a remote computing apparatus including a processor, drive parameter data comprising information on the drive parameters according to which the drive is currently operated from the drive via a communications network;
storing a drive registration data set regarding the drive in a database of the remote computing apparatus, the drive registration data set being acquired during commissioning of the drive, being related to the specific application for which the drive is commissioned, and being only indirectly related to the operation of the drive, the drive registration data set comprising a plurality of drive registration data objects;
generating, with the remote computing apparatus, a first algorithm for determining expected drive registration data object values based on drive parameter data and for estimating expected optimal drive parameters based on drive registration data;
storing, by the remote computing apparatus, the drive parameters to the database;
calculating, in the remote computing apparatus, an expected drive registration data object value for the drive using the first algorithm based on the drive parameter data;
comparing, in the remote computing apparatus, the expected drive registration data object value to a corresponding drive registration data object value included in the drive registration data for the drive; and
in response to the expected drive registration data object value differing from the drive registration data object value included in the drive registration data for the drive based on the comparing, causing, by the remote computing apparatus, sending information on a conflicting registration data object from the remote computing apparatus via the communications network to the drive for displaying, via the user interface, the information on the conflicting drive registration data object value to a user of the drive and prompting, via the user interface of the drive, the user to change the conflicting drive registration data object value maintained in the database.

2. The method as claimed in claim 1, wherein the expected drive registration data object value and the drive registration object value included in the drive registration data for the drive relate to one of the following: process type of the drive, industry where the drive is used, motor type of the drive, motor ratings of the drive, model of the drive, type of gear box of the drive, ratings of the gear box of the drive and location of the drive.

3. The method as claimed in claim 1, wherein when the expected drive registration data object and the drive registration data object included in the drive registration data for the drive relate to a numeric quantity, the method further comprises a pre-defined margin of error in the comparing.

4. The method as claimed in claim 1, wherein the first algorithm determines the expected drive registration data object values based also on one or more drive registration data objects.

5. The method as claimed in claim 1, wherein the first algorithm is created, in the remote computing apparatus, before receiving the drive parameter data from the drive according to an algorithm generation method comprising the steps of:
receiving, in the remote computing apparatus, drive parameter data from a plurality of drives via the communications network, wherein the database maintains at least drive registration data of the plurality of drives acquired during the commissioning of the plurality of drives;

storing the drive parameter data from the plurality of drives to the database;
analyzing, in the remote computing apparatus, the drive parameter data of the plurality of drives and the drive registration data of the plurality of drives stored in the database for obtaining correlations between drive parameters and drive registration data objects; and
based on the analyzing, generating, in the remote computing apparatus, the first algorithm.

6. The method as claimed in claim 5, wherein the generating the first algorithm comprises initializing a pre-written algorithm stored in the remote computing apparatus.

7. The method as claimed in claim 5, the generating of the first algorithm further comprising the steps of:
upon generating the first algorithm, calculating, in the remote computing apparatus, using the first algorithm one or more of the following data sets: expected optimal drive parameter data sets for a plurality of drive registration data sets and expected drive registration data sets for a plurality of drive parameter data sets; and
storing the calculated data sets to the database as a lookup table to be used, instead of the first algorithm, in prospective calculations.

8. The method as claimed in claim 1, wherein the remote computing apparatus comprises a database server comprising the database.

9. The method as claimed in claim 8, wherein the remote computing apparatus additionally comprises one or more other network devices, such as a remote terminal device and a server.

10. The method as claimed in claim 1, wherein the remote computing apparatus is a cloud-based apparatus and the database server is a cloud server.

11. The method of claim 1 wherein the drive registration data relates to one or more of an industry for which the drive is being used, a process for which the drive is being used, a type of the electrical machine, a rating of the electrical machine, a type of a gearbox of the electrical machine, a rating of the gearbox of the electrical machine, and a location of the drive.

12. An apparatus comprising:
at least one processor, and
at least one memory comprising a computer program code, wherein the apparatus is configured to perform the following operations:
receive, in the apparatus, drive parameter data comprising information on drive parameters according to which a drive is currently operated from the drive via a communications network, wherein the drive parameters correspond to optimal drive parameters for the drive;
store, with the apparatus, drive registration data regarding the drive, which is data related to a specific application for which the drive is commissioned and only indirectly related to the operation of the drive in a database, the drive registration data set comprising a plurality of drive registration data objects;
generate, with the apparatus, a first algorithm for determining expected drive registration data object values based on drive parameter data and for estimating expected optimal drive parameters based on drive registration data;
store, by the apparatus, the drive parameter data to the database;
calculate, in the apparatus, an expected drive registration data object value for the drive using the first algorithm, based on the drive parameter data;

compare, in the apparatus, the expected drive registration data object value to a corresponding drive registration data object value included in the drive registration data for the drive; and in response to the expected drive registration data object value differing from the drive registration data object value included in the drive registration data for the drive based on the compare, causing, by the apparatus, sending information on a conflicting registration data object from the apparatus via the communications network to the drive for displaying, via a user interface of the drive, the information on the conflicting drive registration data object value to a user of the drive and prompting, via the user interface of the drive, the user to change the conflicting drive registration data object value maintained in the database.

13. A non-transitory computer readable media comprising:

a set of instructions stored on the non-transitory computer readable media and executable by a processor of a computing device effective to:

receive, in the computing device, drive parameter data comprising information on drive parameters according to which a drive is currently operated from the drive via a communications network, wherein the drive parameters correspond to optimal drive parameters for the drive, and drive registration data regarding the drive, which is data pertaining to a specific application for which the drive is commissioned and only indirectly related to the operation of the drive, is maintained in a database, each drive registration data set comprising a plurality of drive registration data objects;

generating, in the computing device, a first algorithm for determining expected drive registration data object values based on drive parameter data and for estimating expected optimal drive parameters based on drive registration data;

store, by the computing device, the drive parameter data to the database;

calculate, in the computing device, an expected drive registration data object value for the drive using the first algorithm based on the drive parameter data;

comparing, in the computing device, the expected drive registration data object value to a corresponding drive registration data object value included in the drive registration data for the drive; and in response to the expected drive registration data object value differs differing from the drive registration data object value included in the drive registration data for the drive based on the compare, causing sending information on a conflicting registration data object from the computing device via the communications network to the drive for displaying, via a user interface of the drive, the information on the conflicting drive registration data object value to a user of the drive and prompting, via the user interface of the drive, the user to change the conflicting drive registration data object value maintained in the database.

14. A method of drive parameter optimization, comprising;

receiving, in the remote computing apparatus including a processor, drive parameter data comprising information on drive parameters according to which a drive is currently operated from the drive via a communications network, wherein drive registration data regarding the drive, which is data pertaining to a specific system for which the drive is commissioned and only indirectly related to the operation of the drive, is maintained in a database, the drive registration data being up-to-date and;

generating, in the remote computing apparatus, a first algorithm for determining expected drive registration data object values based on drive parameter data and for estimating expected optimal drive parameters based on drive registration data;

calculating, in the remote computing apparatus, the expected optimal drive parameters using the first algorithm;

comparing, in the remote computing apparatus, the expected optimal drive parameters to the drive parameters of the drive; and in response to the expected optimal drive parameters deviating from the drive parameters according to a second algorithm for assessing a deviation between two sets of variables based on the comparing, sending, by the remote computing apparatus, the expected optimal drive parameters from the remote computing apparatus via the communications network to the drive for displaying, via the user interface, the expected optimal drive parameters to a user of the drive and prompting, via the user interface, a user of the drive to change the drive parameters of the drive to match the expected optimal drive parameters.

15. The method as claimed in claim 14, wherein the first algorithm is created, in the remote computing apparatus, before receiving the drive parameter data from the drive according to an algorithm generation method comprising the steps of:

receiving, in the remote computing apparatus, drive parameter data from a plurality of drives via the communications network, wherein the database maintains at least drive registration data of the plurality of drives acquired during the commissioning of the plurality of drives;

storing the drive parameter data from the plurality of drives to the database;

analyzing, in the remote computing apparatus, the drive parameter data of the plurality of drives and the drive registration data of the plurality of drives stored in the database for obtaining correlations between drive parameters and drive registration data objects; and based on the analyzing, generating, in the remote computing apparatus, the first algorithm.

16. The method as claimed in claim 15, wherein the generating the first algorithm comprises initializing a pre-written algorithm stored in the remote computing apparatus.

17. The method as claimed in claim 14, wherein the remote computing apparatus comprises a database server comprising the database.

18. The method as claimed in claim 14, wherein the remote computing apparatus is a cloud-based apparatus and the database server is a cloud server.

* * * * *